United States Patent [19]

Youngs

[11] Patent Number: 4,850,731
[45] Date of Patent: Jul. 25, 1989

[54] COMPACT DISC STORAGE CONTAINER WITH NON-SCRATCHING SURFACE

[76] Inventor: Ross O. Youngs, 5185 Willow Grove Pl. North, Dublin, Ohio 43017

[21] Appl. No.: 190,889

[22] Filed: May 6, 1988

[51] Int. Cl.[4] .................... B42F 13/00; B65D 85/30; B65D 85/57; G09F 1/00
[52] U.S. Cl. .................................. 402/79; 206/311; 206/313; 40/159
[58] Field of Search ............... 402/79; 206/37, 39, 206/310, 311, 312, 313; 281/38; 283/41; 40/359, 360, 159; 150/100, 118

[56] References Cited

U.S. PATENT DOCUMENTS

| 3,422,952 | 1/1969 | George . | |
|---|---|---|---|
| 3,446,260 | 5/1969 | Osher | 40/159 |
| 3,473,653 | 10/1969 | Nunes . | |
| 3,688,898 | 9/1972 | Stanton | 206/311 |
| 3,722,564 | 3/1973 | Croon | 206/311 |
| 3,864,755 | 2/1975 | Hargis . | |
| 4,076,874 | 2/1978 | Giovanelli | 206/313 |
| 4,263,357 | 4/1981 | Holsom | 40/159 |
| 4,327,831 | 5/1982 | Inaba et al. . | |
| 4,339,034 | 7/1982 | Panveno . | |
| 4,413,298 | 11/1983 | Pesok et al. | 206/313 |
| 4,447,973 | 5/1984 | Wihlke | 402/79 |
| 4,473,153 | 9/1984 | Colangelo | 206/312 |
| 4,508,366 | 4/1985 | Brindle . | |
| 4,549,658 | 10/1985 | Sfikas . | |
| 4,610,352 | 9/1986 | Howey et al. | 206/313 |
| 4,620,630 | 11/1986 | Moss . | |
| 4,623,062 | 11/1986 | Chase et al. . | |
| 4,699,268 | 10/1987 | Oishi . | |
| 4,709,812 | 12/1987 | Kosterka . | |

OTHER PUBLICATIONS

Advertisement from "Digital Audio", Dec. 1987, p. 48.
Advertisement from "Herrington–The Enthusiasts' Catalog", Spring 1988, p. 44.

Primary Examiner—Frank T. Yost
Assistant Examiner—Paul M. Heyrana, Sr.
Attorney, Agent, or Firm—Wood, Herron & Evans

[57] ABSTRACT

Storage devices for compact discs are described which protect the optical surface of the stored compact disc from scratches and dust accumulation. The devices are used to store discs singly and in groups of more than one, and provide maximum visibility for viewing the printed surface of the compact disc as well as the accompanying graphics.

24 Claims, 2 Drawing Sheets

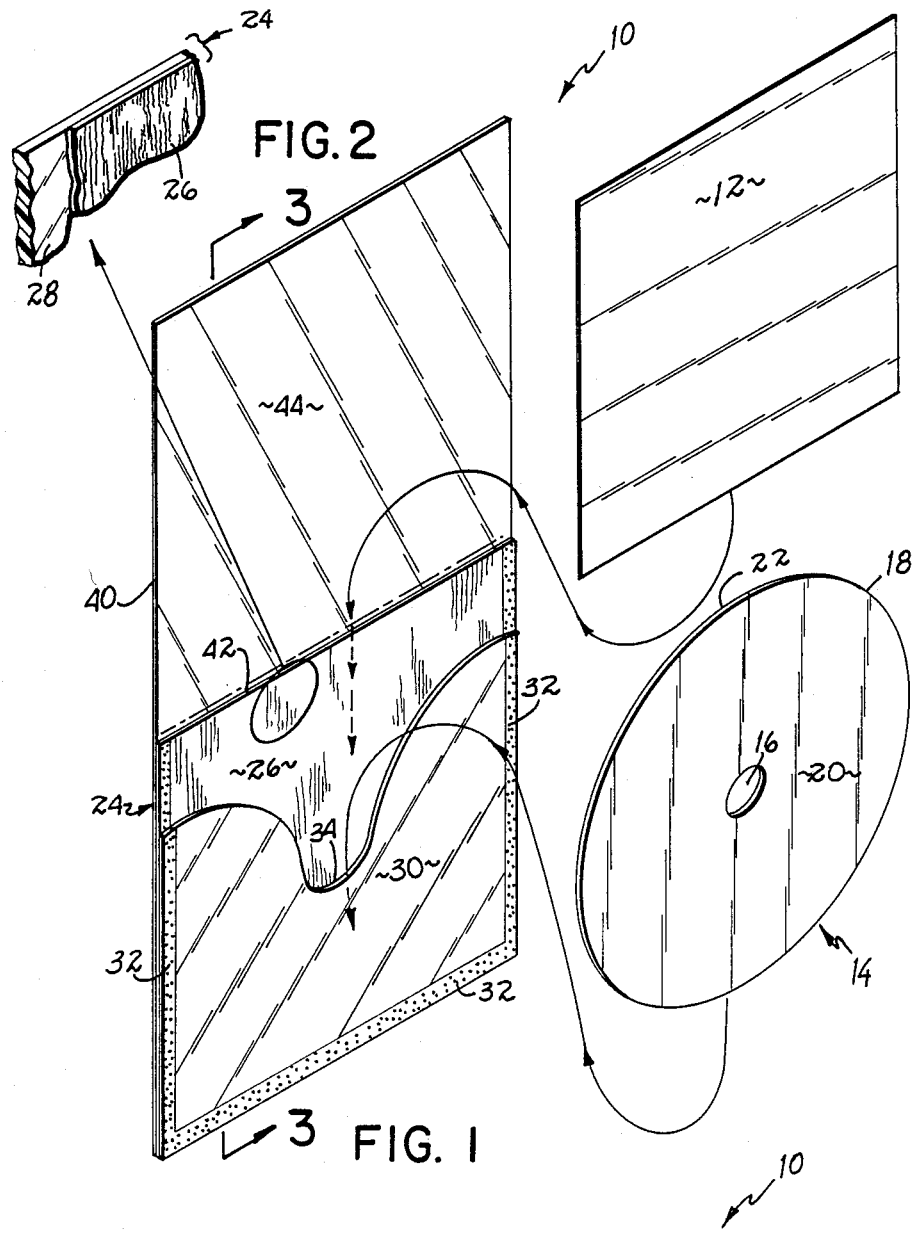
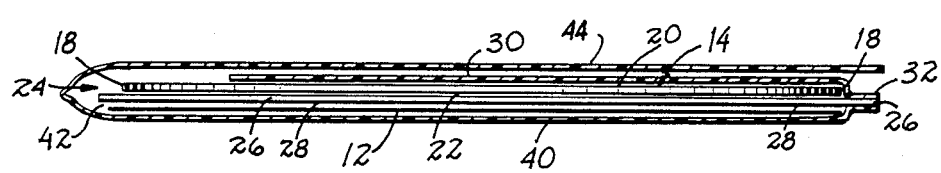

COMPACT DISC STORAGE CONTAINER WITH NON-SCRATCHING SURFACE

FIELD OF THE INVENTION

The invention relates to devices for storing compact discs which achieve improved visibility of the compact disc and accompanying graphics while decreasing the risk of scratches and dust accumulation on the surface of the disc.

BACKGROUND OF THE INVENTION

The introduction of the compact digital audio disc (CD) has resulted in a true advance in audio program playback technology. The compact disc contains a digitally encoded rendering of the program audio signal transferred onto a disc of polycarbonate plastic by molding or stamping. The encoded surface is then uniformly coated with aluminum and coated with a sealant such as lacquer. The aluminum sputtering on the stamped surface creates a reflective surface which is read by a laser beam through the opposite side of the polycarbonate disc. The laser reflection is converted to an audio signal which is heard through standard audio playback components.

The compact disc is considered a substantial advance over the vinyl record album for several reasons. First, the CD is capable of storing considerably more audio program material per unit area than a vinyl album. This permits the use of a much smaller disc for the presentation of recorded music (hence the term "compact" disc). Next, the ability to retain an audio program capable of being digitally decoded results in a substantial improvement in signal to noise ratio and program fidelity when compared with a vinyl record. Finally, the use of a laser beam as the transducer results in little if any degradation of the compact disc playing surface during playback. The playback properties of the compact disc will thus remain essentially unchanged, even after extensive use. However, there are factors which interfere with the reflection of the laser beam from the aluminum sputtered surface and adversely affect CD playback performance. Several such factors are scratches, dust, and fingerprints.

Because of the need to protect the surface of the compact disc through which the laser reflects, i.e., the optical surface, various compact disc storage devices have been developed. By far the most prevalent storage device is a package known as the jewel box. The jewel box consists of two pieces of molded polycarbonate which are hinged along a common side to permit the opening of the box as one would open a book. Snap fit inside one of the polycarbonate pieces is a styrene tray with a center hub which engages the center aperture of the compact disc. The jewel box is slightly larger than the 4.7" diameter of the compact disc. Though the jewel box serves to protect the compact disc, the box itself suffers from certain disadvantages. The box is difficult to open, and it is difficult to remove the compact disc from the centered hub without bending the compact disc. The jewel box is relatively fragile, resulting in breakage of the hinges or the polycarbonate pieces themselves when accidentally dropped. Finally, the jewel box is expensive to manufacture because of the three piece construction and the need to manually assemble the parts.

One alternative to the jewel box for use in after market storage of the compact disc is a device known as the CD Jockee produced by DataPax, Kennewick, Washington. The CD Jockee is a compact disc carrying case which opens into an A-frame shape and has eight two sided, clear vinyl pockets that can carry up to 16 compact discs. The pockets are connected in an overlapping fashion, such that only a small portion of the discs underlying the top disc can be seen. The individual pockets have a clear vinyl front to permit viewing of the side of the compact disc containing identifying printing, and a velour back which contacts the optical surface of the compact disc. The reverse side of each pocket can hold the printed graphics accompanying the compact disc stored on the front, or alternatively it may be used to store another compact disc. The CD Jockee has the disadvantages that when the compact discs are displayed, the discs themselves are exposed to dust because of the open top access to the discs. Further when displayed, one must typically flip through each pocket to find the desired compact disc because only a small portion of the printed surfaces are visible. Also, the velour surfaces generate relatively large amounts of lint which can accumulate on the optical surfaces of the discs.

SUMMARY OF THE INVENTION

The invention relates to a flexible sleeve for storing both a compact disc and its accompanying graphics. The sleeve protects the optical surface of the compact disc from scratches and dust and permits easy removal of the disc from the protective sleeve. The protective sleeve is not as bulky as the commonly available jewel boxes, the overall thickness being only slightly greater than that contributed by the compact disc and graphics. The invention encompasses both a single disc storage sleeve sold with the compact disc and an after-market storage sheet typically comprising space for storing one, two, four or other numbers of compact discs per sheet plus accompanying graphics. A feature of the invention is the use of a nonwoven fabric, preferably polyester, which is joined to a backing sheet to provide a non-scratching, non-linting surface which contacts the optical surface of the compact disc. The accompanying graphics are stored in contact with the backing sheet which has been joined, preferably by heat lamination, to the nonwoven fabric. The graphics include, but are not limited to, song lyrics, information on the performing artist, ordering information, and photographs. The low friction integral backing sheet surface permits easy removal and insertion of the graphics and further serves to resist snagging or tearing from contact with metal staples or other sharp edges associated with the graphics. In both the single disc sleeve and after-market storage sheet there are provided flaps which serve both to shield at least a portion of the printed surface of the compact disc from dust and to maintain the optical surface of the compact disc in close relation to the nonwoven fabric, thus preventing dust from accumulating on that surface.

It is an object of this invention to provide a compact disc storage sleeve which protects the optical surface of the compact disc from dust, scratches and lint.

It is a further object of this invention to provide a smooth sided storage pocket for the graphics accompanying the compact disc which is not susceptible to tearing or snagging.

It is yet a further object of the invention to provide a compact disc storage device which has a width only marginally greater than the combined thickness of the compact disc and accompanying graphics.

It is yet a further object to provide a compact disc storage device which permits viewing of the printed surface of the compact disc and the accompanying graphics through the device itself.

It is yet a further object to provide a compact disc storage device for protectively retaining a plurality of compact discs and accompanying graphics in a space efficient container.

These and other objects and advantages will become readily apparent from the following detailed description of the invention and from the drawings in which:

BRIEF DESCRIPTION OF THE DRAWINGS

FIG. 1 is a front perspective view of the single compact disc storage sleeve depicting the storage positions of the compact disc and accompanying graphics.

FIG. 2 is an exploded view of the construction of the laminated composite sheet.

FIG. 3 is a cross sectional view taken in lines 3,3, of FIG. 1 with the flap folded of the storage sleeve containing the compact disc and graphics.

DETAILED DESCRIPTION OF THE INVENTION

Figure 4:
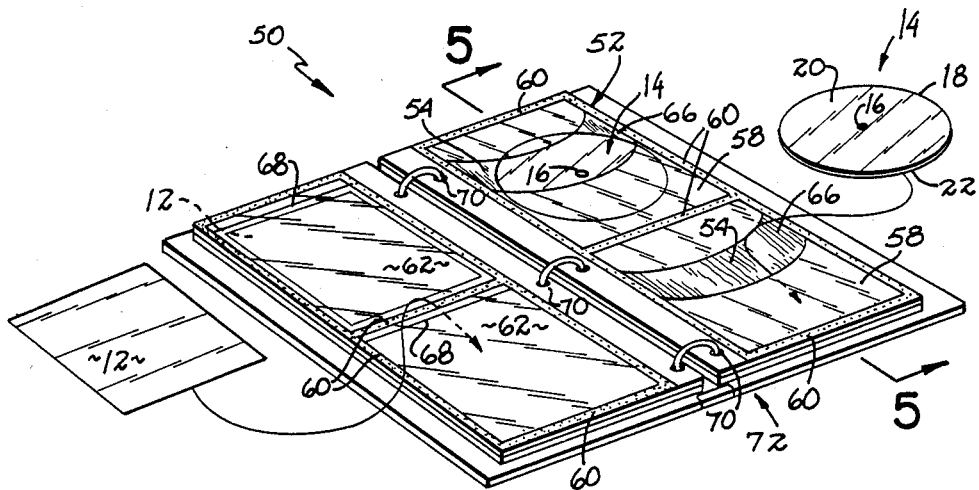
FIG. 4 is a perspective view depicting the front surface of an after-market compact disc storage sheet for two compact discs and the back surface of a preceding sheet secured in a ring binder.

The invention in its broader aspects relates to a flexible sleeve for storing both a single compact disc and accompanying graphics, and for protecting the optical surface of the compact disc from dust and scratches. The compact disc, having an aperture, an edge, a printed surface and an optical surface, is stored in the sleeve comprised of a rectangular composite sheet comprised of a nonwoven fabric joined by a bonding operation to a backing sheet over the entire surface of the fabric, the nonwoven fabric capable of contacting the optical surface of the compact disc; a front sheet disposed over the nonwoven fabric of the composite sheet and joined by a bonding operation along three peripheral edges of the composite sheet to create a pocket accessible along the non-joined edge between the nonwoven fabric and the front sheet for retaining the compact disc; and a pocket forming sheet joined by a bonding operation along three peripheral edges of the backing sheet of the composite sheet to create a pocket accessible along the non-joined edge between the backing sheet and the pocket forming sheet for retaining the graphics, the pocket forming sheet extending beyond the non-joined edge between the nonwoven fabric and the front sheet to form a flap.

It is preferred that the backing sheet of the composite sheet be produced from polyvinyl chloride, hereinafter referred to as vinyl. Polyvinyl chloride (vinyl) is a thermoplastic polymer having an average molecular weight in the range of about 60,000 to about 150,000 g/mole. Vinyl is typically available as a white powder which can be converted into sheets or films. Vinyl is sold by various manufacturers under a number of trademarks, such as "GEON" Resins by B. F. Goodrich Chemical Co. The vinyl employed in carrying out the teachings of this invention is of the type typically used to prepare films and sheets. Generally, such vinyl has an inherent viscosity in the range of about 0.70 to about 1.30, as determined by ASTM Method D-1243. To impart flexibility to the vinyl, plasticizer is added. The amount of plasticizer added affects the tensile and elastic properties of the vinyl sheet, otherwise designated as the "hand" of the sheet. The hand of a sheet serves as a shorthand description of the textural qualities of the sheet, and is represented by "S" and "H" values. Larger "S" numbers indicate a more flexible or tacky sheet. Larger "H" numbers indicate a stiffer sheet. The table below sets out typical hand values for vinyl sheet utilized according to this invention, with accompanying plasticizer levels and specific gravities of the sheets.

TABLE I

| Hand | 2S | 3S | 4S | 2H | 3H |
|---|---|---|---|---|---|
| PHR* | 40 | 44 | 48 | 29 | 25 |
| Specific Gravity | 1.30 | 1.30 | 1.28 | 1.29 | 1.30 |

*Parts plasticizer per 100 parts resin

Preferably the sleeve contains a front vinyl sheet which is formed in such a manner as to permit simultaneous access to the edge and the aperture of the compact disc. The simultaneous access permits the user to grasp the compact disc using only the thumb and a finger so that the optical surface of the disc receives no fingerprints or smudges which would interfere with the playback characteristics of the disc. It is preferred that the pocket forming sheet be produced from vinyl, and that the flap of the pocket forming sheet overlies the pocket for retaining the compact disc. In this way the optical surface of the disc tends to remain in close relation to the nonwoven fabric of the composite sheet and reduces the accumulation of dust and other contaminants from outside the sleeve. Preferably, the flap overlies a substantial portion of the front sheet, thereby attaining an improved seal for rejecting dust and other contaminants. Vinyl is employed as the preferred material because, among other properties, it can be used to produce either clear or color-containing sheets, it is durable and it is chemically inert to the compact disc. However, other polymeric materials also have these properties, and it is contemplated that other materials may be employed, such as certain polyesters for example.

The nonwoven fabric of the composite sheet is produced preferably from polyester fiber. A specific example of the fiber anticipated for use in this invention is "SONTARA" spunlaced fabric produced by E. I. DuPont de Nemours & Company, Inc. "SONTARA" fabric is a bulky, soft, strong, conformable, lightweight sheet made of hydraulically interlaced fibers with no chemical or thermal bonding. The polyester fibers used to produce a "SONTARA" fabric sheet are softer than cellulosic fibers such as cotton or paper. Thus, the optical surface of a compact disc is less likely to be scratched by the polyester nonwoven sheet. Though the polyester fabric is preferred, it is contemplated that other nonwoven fabrics joinable to a backing sheet may also be used.

It is preferred that the front sheet of the sleeve be transparent so as to achieve maximum visibility of the printed surface of the compact disc. It is preferred that the pocket forming sheet also be transparent to achieve maximum visibility of the graphics. The backing sheet may be produced as a clear sheet, a matte sheet, or a color-added sheet.

Referring to the drawings, FIG. 1 depicts the single pocket compact disc sleeve 10, into which is inserted graphics 12 and compact disc 14. The compact disc 14 has an aperture 16, an edge 18, a printed surface 20, and an optical surface 22.

The sleeve 10 is comprised of a composite sheet 24 which consists of a nonwoven fabric 26 joined to a backing sheet 28, as shown in FIG. 2. The nonwoven fabric 26 is joined over its entire surface to the backing sheet 28, preferably by a heat lamination process which partially melts the backing sheet 28 but does not affect the nonwoven fabric 26. Heat lamination fixes the fabric 26 onto the backing sheet 28, and decreases the possibility of snagging, tearing, or pulling the fabric 26. Heat for the heat lamination operation described throughout this invention is provided typically by thermal radiation; radio frequency radiation, encompassing high frequency and electrostatic sealing methods; or ultrasonic radiation. The backing sheet is preferably vinyl having a sheet thickness of about 0.006 inch, a hand of "2S" and a melting point in the range of about 250° F. to about 350° F. The vinyl backing sheet 28 has an acceptable thickness in the range of about 0.003 inch to about 0.008 inch, preferably in the range of about 0.004 inch to about 0.006 inch. The vinyl backing sheet has an acceptable hand in the range of 2S to 4S. The preferred nonwoven fabric, "SONTARA" polyester, melts at about 490° F. The "SONTARA" polyester fabric is available in a variety of usable styles, but the preferred fabric style is that designated as "8001", having as typical properties a unit weight of 1.0 oz/yd$^2$, a thickness of 0.011 inch, a Mullen Burst Value of 23 psi, and a Frazier Air Permeability of 600 CFM/ft$^2$ at 0.5 inch H$_2$O. Alternatively, other methods of joining the nonwoven fabric 26 to the backing sheet 28 may be utilized, such as by adhesives, chemical modification, or extrusion coating/laminating of the mating surfaces.

The front sheet 30, which preferably is clear or transparent, is disposed over the nonwoven fabric 26 of the composite sheet 24 and is joined along three peripheral edges 32 to define a pocket into which the compact disc 14 is inserted. Preferably, the bond is created by heat lamination, though other means of bonding, such as adhesives, or chemical modification of the mating surfaces may be used. Where heat lamination is employed, the backing sheet 28 and front sheet 30 partially melt through the nonwoven fabric 26 to form a seal which bonds the separate sheets together on cooling. The front sheet 30 is preferably vinyl having a sheet thickness of about 0.006 inches, a hand of 2H, and a melting point in the range of about 250° F. to about 350° F. The vinyl front sheet 30 has an acceptable thickness in the range of about 0.004 inch to about 0.008 inch. The sheet has an acceptable hand in the range of 2H to 3H. It is preferred that the optical surface 22 of the compact disc 14 lie in close relation to the nonwoven fabric 26 to minimize the possibility of scratching or accumulation of dust. The printed surface 20 is then visible through the front sheet 30, permitting ease of identification of the compact disc. The front sheet is formed in a manner to permit improved access to the compact disc along non-joined edge 34, either before joining to the composite sheet 24, or alternatively simultaneously with or immediately after joining through use of a kiss cutting operation which is capable of cutting the front sheet 30 without affecting the composite sheet 24. The kiss cutting operation is a method for precision cutting a single layer of a multi-layer unit while leaving the remaining layers unaffected. This forming step permits one to insert or remove the compact disc from the sleeve 10 by grasping the compact disc at the aperture 16 and the edge 18 between the thumb and finger.

The pocket forming sheet 40 is joined along three peripheral edges 32 to the backing sheet 28 of the composite sheet 24 preferably by partial melting of the respective sheets along the edges by a heat lamination operation. The pocket forming sheet 40 is preferably vinyl having a sheet thickness of about 0.006 inches, a hand of 2H, and a melting point in the range of about 250° F. to about 350° F. The acceptable ranges for the thickness and hand of the vinyl pocket forming sheet 40 are about 0.004 inch to about 0.008 inch, and 2H to 3H, respectively. Along the nonjoined edge 42 is an opening which permits placement of the graphics 12 into a pocket formed by the peripheral edges 32. The pocket forming sheet 40 is preferably transparent to permit maximum visibility of the graphics 12 through the sheet itself. The pocket forming sheet 40 extending beyond the non-joined edges 34 and 42 is designated as the flap 44 which preferably overlies the front sheet 30.

The single pocket compact disc sleeve 10 with the flap 44 closed is depicted in the cross-sectional view of FIG. 3. It should be noted that the preferred position for the non-joined edge 42 is one which is adjacent to that of non-joined edge 34. However, it is not required that the non-joined edges be adjacent.

The invention also encompasses an aftermarket flexible sheet for inclusion in a binding device. The binding device is preferably one which permits additional sheets to be added when necessary, such as can be accomplished using a ring binder. Such a sheet is designed for storing at least one compact disc, each having an aperture, an edge, a printed surface and an optical surface, and accompanying graphics. As with the single pocket compact disc sleeve, the after-market flexible sheet is used for protecting the optical surfaces of the compact discs from dust and scratches and is further designed to permit securement in a binding device. Broadly, the flexible sheet comprises a rectangular composite sheet comprised of a nonwoven fabric joined by a bonding operation to a backing sheet over the entire surface of the fabric, the nonwoven fabric capable of contacting the optical surface of the compact disc; a front sheet disposed over the nonwoven fabric of the composite sheet having at least one channel thereon for accepting each compact disc, the front sheet joined by a bonding operation onto the composite sheet to form at least one discrete pocket accessible through each channel for storing each compact disc; and a back sheet disposed over the backing sheet of the composite sheet having at least one channel thereon for accepting graphics, the back sheet joined by a bonding operation onto the composite sheet to form at least one discrete pocket accessible through each channel for storing the graphics. It is preferred that each individual channel on the front sheet be formed to permit simultaneous access to the edge and aperture of each compact disc. As with the single pocket compact disc sleeve, for maximum visibility it is preferred that the front sheet be transparent, and also that the back sheet be transparent. The nonwoven fabric used in the multiple pocket flexible sheet is preferably produced from polyester fiber, such as the Sontara material described above.

Referring to the drawings, FIG. 4 depicts multiple pocket flexible sheets 50 for storing two compact discs 14 per sheet showing the back side of the sheet on the left and the front side on the right. Alternatively, the invention encompasses a flexible sheet for storing one compact disc per sheet, and for storing four compact discs per sheet in a format of two rows of discs, with two discs per row. It is preferred that the respective sheets be punchable to permit securement in a ring binder. The construction of the respective flexible sheets differs only in the size of the sheets and the number of joint lines employed. A composite sheet 52 is comprised of nonwoven fabric 54 joined over its entire surface to a backing sheet 56 preferably by a heat lamination process, though other bonding methods may be used. The backing sheet is preferably vinyl having a sheet thickness of about 0.006 inch, a hand of 2S and a melting point in the range of about 250° F. to about 350° F. The vinyl backing sheet 56 has an acceptable thickness in the range of about 0.003 inch to about 0.008 inch, preferably in the range of about 0.004 inch to about 0.006 inch. The vinyl backing sheet has an acceptable hand in the rang of 2S to 4S. The preferred nonwoven fabric, "SONTARA" polyester, melts at about 490° F. The "SONTARA" polyester fabric is available in a variety of usable styles, but the preferred fabric style is that designated as "8001", having as typical properties a unit weight of 1.0 oz/yd$^2$, a thickness of 0.011 inch, a Mullen Burst Value of 23 psi, and a Frazier Air Permeability of 600 CFM/ft$^2$ at 0.5 inch $H_2O$.

The front sheet 58, which preferably is transparent, is joined to the composite sheet 52 along a plurality of joint lines 60. The front sheet 58 is preferably vinyl having a sheet thickness of about 0.006 inch, a hand of 2H, and a melting point in the range of about 250° F. to about 350° F. The vinyl front sheet 58 has an acceptable thickness in the range of about 0.004 inch to about 0.008 inch. The sheet has an acceptable hand in the range of 2H to 3H. Preferably the joint line is created by heat lamination, though other means of bonding, such as adhesives, or chemical modification of the mating surfaces may be used. Where heat lamination is employed, the backing sheet 56 and front sheet 58 partially melt through the nonwoven fabric 54 to form a seal which bonds the separate sheets together on cooling. Where vinyl is employed in conjunction with nonwoven polyester fabric, such as the "SONTARA" fabric in producing either the sleeve or the sheet, a temperature between the 250°–350° F. melting range of the vinyl sheets and the 490° F. melt point of the "SONTARA" fabric is employed t achieve bonding.

The reverse sheet 62 is joined to the backing sheet 56 of composite sheet 52, also preferably by heat lamination, along joint lines 60. The reverse sheet 62 is preferably vinyl having a sheet thickness of about 0.006 inch, a hand of 2H, and a melting point in the range of about 250° F. to about 350° F. As with the vinyl front sheet 58, the acceptable ranges for the thickness and hand of the vinyl reverse sheet 62 are about 0.004 inch to about 0.008 inch, and 2H to 3H, respectively.

The compact disc 14 is stored by inserting the disc through the front channel 66 so that the entire optical surface 22 is in contact with the nonwoven fabric 54. The front channel 66 is formed preferably by a kiss cutting operation simultaneously with or immediately after joining of the front sheet 58 to the composite sheet 52. Alternatively, the channel 66 is cut into the front sheet 58 prior to joining. The printed surface 20 can then be viewed through the front sheet 58 which preferably is transparent to aid in identifying the particular compact disc. Graphics 12 are stored on the back side of the multiple pocket flexible sheet, depicted on the left of FIG. 4. The graphics are inserted through the back channel 68 created in reverse sheet 62 preferably by a kiss cutting operation simultaneously with or immediately after joining of the reverse sheet 62 to backing sheet 56. Alternatively, the channel 68 is cut into the reverse sheet 62 prior to joining. The reverse sheet 62 is preferably transparent to permit maximum visibility of the graphics. It is preferred that the multiple pocket flexible sheet 50 be punchable to permit formation of binder holes 70 which allows securement in ring binder 72.

Figure 5:
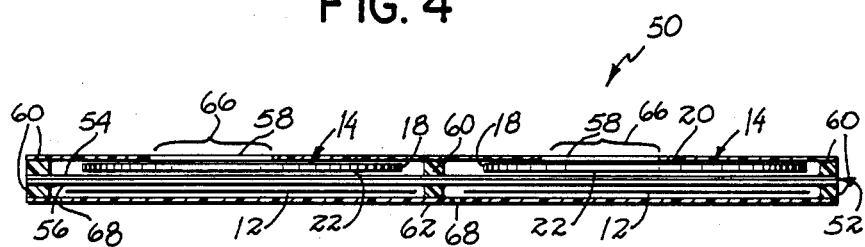
FIG. 5 is a cross-sectional view taken in lines 5,5 of FIG. 4 of a multiple disc storage sheet.

In the cross-sectional view of FIG. 5, the multiple pocket flexible sheet 50 is shown with a full complement of compact discs 14 and graphics 12. It is possible, of course, to create flexible sheets capable of storing even larger numbers of compact discs following the teachings of this invention.

The single pocket compact disc sleeve 10 is produced by first bonding the nonwoven fabric 26 to the backing sheet 28 over the entire surface of the nonwoven fabric, preferably by heat lamination. Where vinyl and "SONTARA" nonwoven polyester fabric is used, the heat laminating temperature will be greater than the 250°–350° F. melt range of the vinyl and less than the 490° F. melt point of the "SONTARA" fabric. The nonwoven fabric 26 of the composite sheet 24 is then brought in contact with material which will become front sheet 30 while the backing sheet 28 of composite sheet 24 is brought in contact with material which will become pocket forming sheet 40. The respective sheets are then joined along edges 32, preferably by heat lamination. The material becoming front sheet 30 is either formed to permit simultaneous access to the aperture 16 and edge 18 of compact disc 14 prior to joining of the edges 32, or preferably is formed simultaneously with or immediately after joining of the edges 32 by a kiss cutting operation. The flap 44 is preferably creased by application of pressure, heat, or both to lie in close relation to the front sheet 30 and improve the overall appearance of the single pocket CD sleeve 10.

The flexible sheet 50 is produced in a manner similar to that of the single pocket sleeve. The composite sheet 52 is formed by contacting nonwoven fabric 54 and backing sheet 56 and joining the two over the entire surface of the nonwoven fabric 54, preferably by heat lamination, which partially melts the backing sheet 56 onto the nonwoven fabric 54. The nonwoven fabric 54 of the composite sheet 52 is then brought in contact with material which will become front sheet 58 while the backing sheet 56 of composite sheet 52 is brought in contact with material which will become reverse sheet 62. The respective sheets are then joined along joint lines 60, preferably by heat lamination. The front channels 66 in front sheet 58 and the back channels 68 in reverse sheet 62 are formed prior to creation of the joint lines 60, or preferably are formed simultaneously with or immediately after creation of the joined lines 60 by a kiss cutting operation. For sheets securable in a ring binder, preferably the punching operation to form the individual binder holes 70 is performed at the same time as the joint lines 60 are formed. Alternatively, the binder holes 7 are created after formation of the joint lines 60.

It is contemplated that the polymeric materials utilized in the invention may also have incorporated therein a variety of chemical additives such as antistatic compounds, ultra-violet radiation absorbers, plasticizers, and the like which improve the use characteristics of the storage sleeve or sheet without adversely affecting the compact disc or graphics.

The single pocket compact disc sleeve is intended for sale as an original storage package for a compact disc, to be sold with the compact disc and used as a replacement for the jewel box. The single pocket sleeve can be enclosed in the plastic packaging presently used to display the compact disc at record stores. Because the sleeve is thinner than the jewel box, packaging can be produced which will require less space, permitting more selections to be displayed in a unit area than is presently possible through utilization of the jewel box. The dimensions of a single pocket sleeve for a standard 4.7 inch diameter disc are about 5.25 inches square from edge to edge. A sleeve containing a compact disc and graphics is approximately 0.10 inch thick.

The single pocket sleeve is less susceptible to damage than the jewel box. The sleeve containing a CD and graphics can be accidentally dropped onto the floor typically without damage to the sleeve or the CD. The flexible components of the sleeve tend to absorb shock without transmitting it to the compact disc.

The after-market flexible sheet is intended for after-the-sale storage of the compact discs. The use of the flexible sheet in combination with a ring binder provides a space-efficient method of safely storing large numbers of compact discs. The flexible sheet pockets for a standard 4.7 inch diameter disc are approximately 5.25 inches square. The punchable margin is about 0.75 inch. A sheet containing compact discs and accompanying graphics is approximately 0.10 inch thick.

Presently, compact discs contain recorded material on only one side of the disc. It is contemplated that advances in technology, coupled with an increased need to maximize storage density per unit area of disc surface, will result in discs containing storage space on both sides of the disc. It can be appreciated that with minor modification, a sleeve or flexible sheet can be manufactured having nonwoven fabric disposed against both surfaces of the compact disc. The invention is also equally applicable for storage of discs having both larger and smaller diameters than the commonly available 4.7 inch diameter disc.

What is claimed is:

1. A flexible sleeve for storing both a single compact disc having an aperture, an edge, a printed surface and an optical surface, and accompanying graphics, and for protecting the optical surface of said compact disc from dust and scratches comprising:
   a rectangular composite sheet comprised of a nonwoven fabric joined by a bonding operation to a backing sheet over the entire surface of said fabric, said nonwoven fabric capable of contacting said optical surface of said compact disc;
   a transparent front sheet disposed over said nonwoven fabric of said composite sheet, said front sheet formed in a manner to permit simultaneous access to said edge and said aperture of said compact disc and joined by a bonding operation along three peripheral edges of said composite sheet to create a pocket accessible along the non-joined edge between said nonwoven fabric and said front sheet for retaining said compact disc; and
   a pocket forming sheet joined by a bonding operation along three peripheral edges of said backing sheet of said composite sheet to create a pocket accessible along the non-joined edge between said backing sheet and said pocket forming sheet for retaining said graphics, said pocket forming sheet extending beyond said non-joined edge between said nonwoven fabric and said front sheet to form a flap.

2. The sleeve of claim 1 wherein said front sheet is formed by kiss cutting.

3. The sleeve of claim 1 wherein said flap of said pocket forming sheet overlies said pocket of retaining said compact disc.

4. The sleeve of claim 3 wherein said flap overlies a substantial portion of said front sheet.

5. The sleeve of claim 1 wherein said nonwoven fabric is produced from polyester fiber.

6. The sleeve of claim 1 wherein said backing sheet, said front sheet, and said pocket forming sheet are produced from vinyl.

7. The sleeve of claim 6 wherein said backing sheet bonded to said nonwoven fabric has a thickness in the range of about 0.003 to about 0.008 inch.

8. The sleeve of claim 6 wherein said vinyl of said backing sheet, said front sheet and said pocket forming sheet have a melting point in the range of about 250° F. to about 350° F.

9. The sleeve of claim 8 wherein said bonding operation involves application of heat to achieve at least partial melting of said vinyl.

10. The sleeve of claim 1 wherein said pocket forming sheet is transparent.

11. The sleeve of claim 1 wherein said nonjoined edge between said nonwoven fabric and said front sheet is adjacent to said non-joined edge between said backing sheet of said composite sheet and said pocket forming sheet.

12. The sleeve of claim 1 wherein said flap of said pocket forming sheet is creased adjacent to said non-joined edge between said nonwoven fabric and said front sheet.

13. The sleeve of claim 1 wherein said bonding operation is heat lamination.

14. A flexible sheet for storing at least one compact disc, each said disc having an aperture, an edge, a printed surface and an optical surface, and accompanying graphics, and for protecting the optical surface of each said compact disc from dust and scratches, wherein said sheet is securable in a binding device, comprising:
   a rectangular composite sheet comprised of a nonwoven fabric joined by a bonding operation to a backing sheet over the entire surface of said fabric, said nonwoven fabric capable of contacting said optical surface of each said compact disc;
   a transparent front sheet disposed over said nonwoven fabric of said composite sheet having at least one channel thereon for accepting each said compact disc, said front sheet jointed by a bonding operation onto said composite sheet to form at least one discrete pocket accessible through each said channel for storing each said compact disc, said channel formed to permit simultaneous access to said edge and said aperture of each said compact disc; an
   a reverse sheet disposed over said backing sheet of said composite sheet having at least one channel thereon for accepting said graphics, said reverse sheet joined by a bonding operation onto said composite sheet to form discrete pockets accessible through each said channel for storing said graphics.

15. The flexible sheet of claim 14 wherein said binding device is a ring binder.

16. The flexible sheet of claim 14 wherein said nonwoven fabric is produced from polyester fiber.

17. The flexible sheet of claim 14 wherein said backing sheet, said front sheet, and said reverse sheet are produced from vinyl.

18. The flexible sheet of claim 17 wherein said vinyl of said backing sheet, said front sheet and said reverse sheet has a melting point in the range of about 250° F. to about 350° F.

19. The flexible sheet of claim 18 wherein said bonding operation involves application of heat to achieve at least partial melting of said vinyl.

20. The flexible sheet of claim 14 wherein said reverse sheet is transparent.

21. The flexible sheet of claim 14 in combination with a ring binder.

22. The flexible sheet of claim 17 wherein each said channel of said front sheet is formed by kiss cutting.

23. A flexible sleeve for storing both a single compact disc having an aperture, an edge, a printed surface and an optical surface, and accompanying graphics, and for protecting the optical surface of said compact disc from dust and scratches comprising:

a rectangular composite sheet comprised of a nonwoven polyester fabric heat laminated to clear vinyl over the entire surface of said fabric, said nonwoven polyester fabric capable of contacting said optical surface of said compact disc;

a front clear sheet disposed over said nonwoven polyester fabric of said composite sheet and formed in a manner to permit simultaneous access to said edge and said aperture of said compact disc, said front vinyl sheet heat laminated to said composite sheet along three peripheral edges to create a pocket accessible along the non-laminated edge between said nonwoven fabric and said front vinyl sheet for retaining said compact disc; and a pocket forming clear vinyl sheet heat laminated along three peripheral edges of said vinyl of said composite sheet to create a pocket accessible along the non-laminated edge between said vinyl of said composite sheet and said pocket forming sheet for retaining said graphics, said pocket forming sheet extending beyond said non-laminated edge between said nonwoven fabric and said front sheet to form a flap, said flap overlying said pocket for retaining said compact disc.

24. A flexible sheet for storing at least one compact disc, each said disc having an aperture, an edge, a printed surface and an optical surface, and accompanying graphics, and for protecting the optical surface of each said compact disc from dust and scratches, wherein said sheet is punchable to permit securement in a ring binder, comprising:

a rectangular composite sheet comprised of a nonwoven polyester fabric heat laminated to a clear vinyl backing sheet over the entire surface of said fabric, said nonwoven polyester fabric capable of contacting said optical surface of each said compact disc;

a front clear vinyl sheet disposed over said nonwoven polyester fabric of said composite sheet having at least one channel thereon for accepting each said compact disc and formed to permit simultaneous access to the edge and aperture of each said compact disc, said front vinyl sheet heat laminated to said composite sheet to form at least one discrete pocket accessible through each said channel for storing each said compact disc; and a reverse clear vinyl disposed over said vinyl backing sheet of composite sheet having at least one channel for accepting said graphics, said reverse sheet laminated to said composite sheet to form at lea one discrete pocket accessible through each said channel for storing said graphics.

* * * * *